(No Model.)
C. J. REED.
MAGNETO ELECTRIC INDUCTION APPARATUS.
No. 510,613.                                   Patented Dec. 12, 1893.
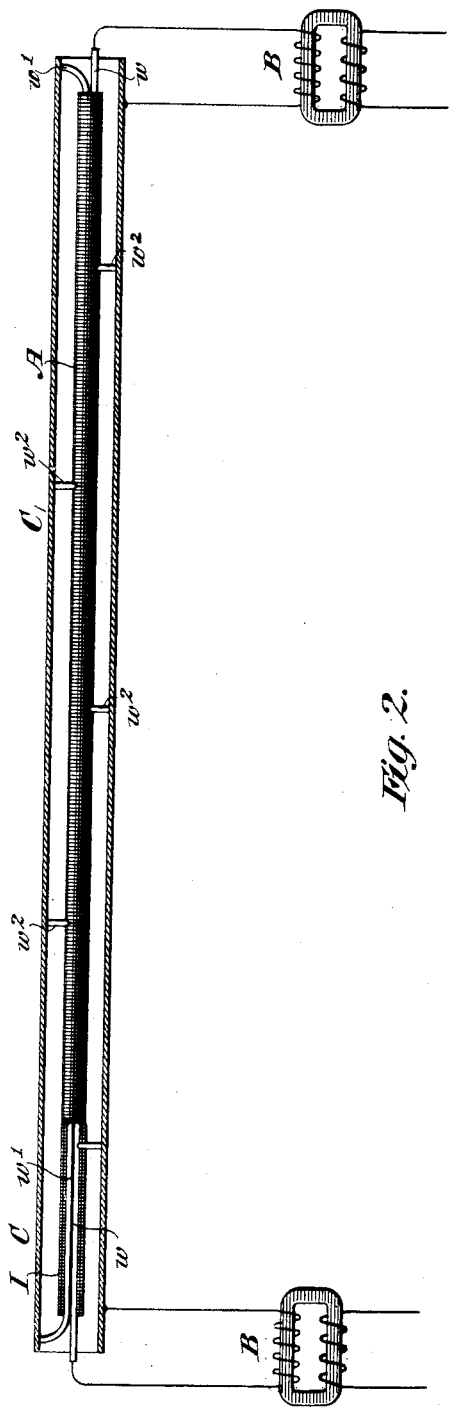
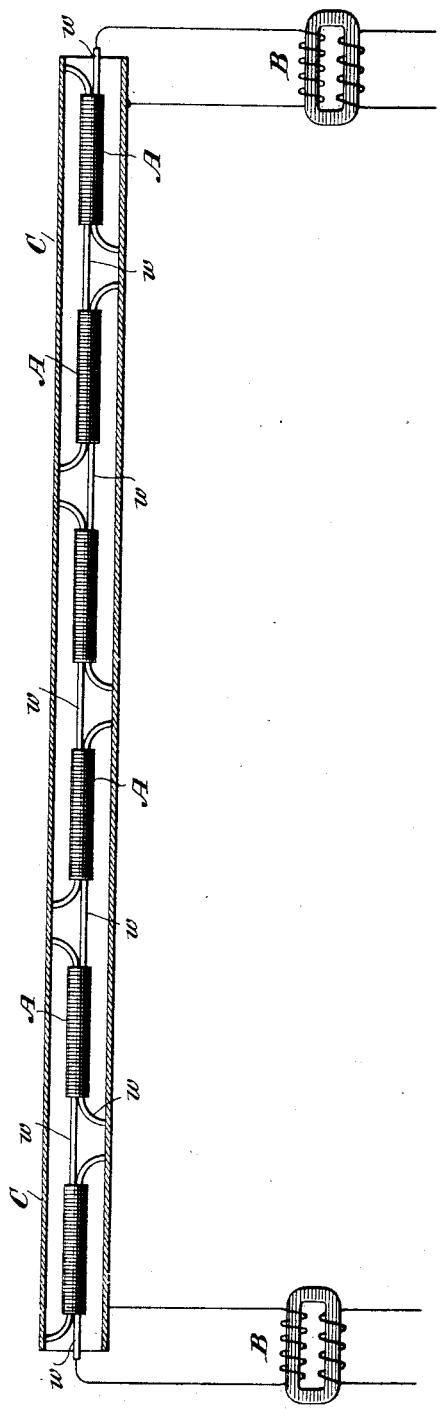
Witnesses
C. E. Ashley
H. W. Lloyd
Inventor
Charles J. Reed
By his Attorney
Charles J. Kintner

UNITED STATES PATENT OFFICE.

CHARLES J. REED, OF ORANGE, NEW JERSEY, ASSIGNOR OF ONE-HALF TO GUSTAV STAHL, OF PHILADELPHIA, PENNSYLVANIA.

MAGNETO-ELECTRIC INDUCTION APPARATUS.

SPECIFICATION forming part of Letters Patent No. 510,613, dated December 12, 1893.

Application filed September 10, 1892. Serial No. 445,547. (No model.)

*To all whom it may concern:*

Be it known that I, CHARLES J. REED, a citizen of the United States of America, residing at Orange, in the county of Essex and State of New Jersey, have invented certain new and useful Improvements in Magneto-Electric Induction Apparatus, of which the following is a specification.

My invention is directed particularly to a novel means or apparatus for transferring induced electrical impulses between two or more distant points and its objects are, first, to utilize the conductors over which the currents flow as a part of the inductive system; second, to provide an inductive system having relatively large inductive and small statical capacity thereby adapting it for use on long circuits between widely separated stations as in cable telegraphy, systems for transferring electrical energy and the like; third, to accomplish any and all results naturally attributable to the apparatus hereinafter described, the novel features of which are particularly pointed out in the claims which follow.

My invention will be fully understood by referring to the accompanying drawings, in which—

Figure 1 is a part sectional part elevational view of the apparatus connected to converters or inductoriums of well known form at each end of the system, and Fig. 2 is a similar view of a modified form thereof.

I make use of the well known principle that electrical impulses when transmitted through a conductor will set up an inductive field about that conductor and induce similar secondary impulses in any conductor or conductors located parallel thereto and in the inductive field thereof. I construct a cable which when completed consists of successive sets of converters in which the secondary conductor of each constitutes the primary circuit of the next converter in advance reckoning from either end of the completed cable. I connect the ends of the primary and secondary conductors to a surrounding metallic or other conducting shield or casing and provide an inductive field of magnetic material for each of such converters.

My invention will be fully understood by referring now to the drawings in detail in both of the figures of which B B represent converters of well known form, and C a metallic conducting casing.

Referring first to Fig. 1: $w$ and $w'$ are insulated conductors lying side by side throughout the entire distance between two stations, the conductor $w$ being connected at each end of the line directly to the terminals of the converters B and to the outer metallic coating C while the conductor $w'$ is connected at both ends directly to said metallic casing. $w^2$ $w^2$ are insulated branch conductors located at stated distances apart, those on the lower side of the drawings connecting the conductor $w$ directly with the outer metallic casing C, while those on the upper side and intermediate between those just described connect the conductor $w'$ with said metallic casing. I is a metallic coating or sheathing preferably of iron wire wound in layers (one or more as the necessities of the case may demand) around the two parallel conductors $w$ $w'$ and constituting an inductive field around said conductors.

The operation of the apparatus is apparent, it being obvious that when an impulse is set up from any source of current supply through the primary of say the left hand converter B, a secondary or induced impulse will be set up through the conductor $w$ and the first one of the short conductors $w^2$ returning through the outer casing C thereby inducing in the first section of the conductor $w'$ parallel thereto an impulse which in turn induces in the next succeeding section a corresponding induced impulse and so on through the series until the final impulse is effected through the conductor $w$ and its connections through the coil of the right hand converter B which in turn induces the working impulse in the translating device not shown. It is apparent that with such an arrangement of primary and secondary circuits and an inductive field of magnetic material I there will result large electro-magnetic inductive effects and correspondingly small statical effects thereby enabling the production at the distant or receiving end of the line of relatively large inductive effects.

In the modified form shown in Fig. 2 I do away with the continuous conductors shown in Fig. 1 as $w$ and $w'$ and supplant them with a series of short conductors $w\ w$, the ends of which project past each other in alternating order and are connected to the outer casing C, the parallel or inductive portions of said circuits being surrounded with iron wire or other magnetic casings as shown at A while the intermediate portions between these casings constitute the conducting portions, this form of the apparatus being cheaper and easier to construct than that illustrated in Fig. 1. The operation of this modified form is obvious on inspection of the drawings.

I am aware that a line converter or inductorium consisting of two parallel insulated wires surrounded by a casing of inductive material and constituting an inductive field therefor has heretofore been devised and I make no claim hereinafter broad enough to include such a structure. I believe it is new with me however to arrange a series of converters of this type in such a manner that the secondary circuit of each converter constitutes the primary circuit of the next line converter in the series and my claims are directed broadly to this feature and this whether the successive converters be provided either with or without the surrounding inductive field or fields shown in the drawings.

Having thus described my invention, what I claim, and desire to secure by Letters Patent of the United States, is—

1. An electrical inductive apparatus consisting of a series of converters having their primary and secondary conductors arranged side by side in successive pairs, substantially as described.

2. A series of converters consisting each of a pair of insulated primary and secondary conductors located side by side and connected to a common return circuit, substantially as described.

3. An electrical inductive apparatus consisting of two or more insulated primary and secondary conductors located side by side and connected at their terminal to a common return circuit, substantially as described.

4. An electrical inductive apparatus consisting of two or more insulated primary and secondary conductors located side by side and surrounded throughout their entire length by a conducting shield which acts as a common return circuit, substantially as described.

5. An electrical inductive apparatus consisting of two or more insulated conductors located side by side a surrounding magnetic field of inductive material and a common return circuit to which both ends of the conductors are attached, substantially as described.

6. An electrical inductive apparatus consisting of two or more insulated conductors surrounded by a magnetic inducing shield and an outer casing of conducting material to which the ends of the inner conductors are connected.

7. An electrical inductive apparatus consisting of pairs of insulated conductors located side by side and surrounded by an inducing medium and an exterior conducting shell or casing to which all of the inner conductors are connected, substantially as described.

8. An electrical inductive apparatus consisting of a series of pairs of parallel insulated conductors, each pair being surrounded by an independent inducing medium and all inclosed in a conducting shield to which the ends of all of the conductors are secured, substantially as described.

9. An electrical inductive system consisting of two converters located one at each end of an intermediate compound cable converter composed of pairs of insulated parallel conductors connected to each other and the converters in the order described.

10. A compound cable converter consisting of a series of pairs of parallel conductors, each pair being surrounded by an inducing medium and all inclosed in a conducting shield or casing to which all of the inner conductors are connected, substantially as described.

CHARLES J. REED.

Witnesses:
C. J. KINTNER,
M. M. ROBINSON.